H. B. SCOTT.
GRASS BORDER SHEARS.
APPLICATION FILED NOV. 28, 1919.
1,338,873.
Patented May 4, 1920.
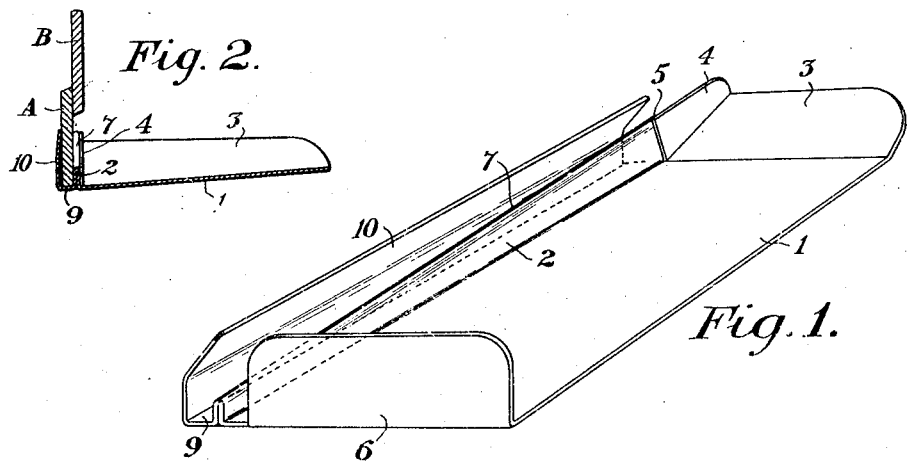
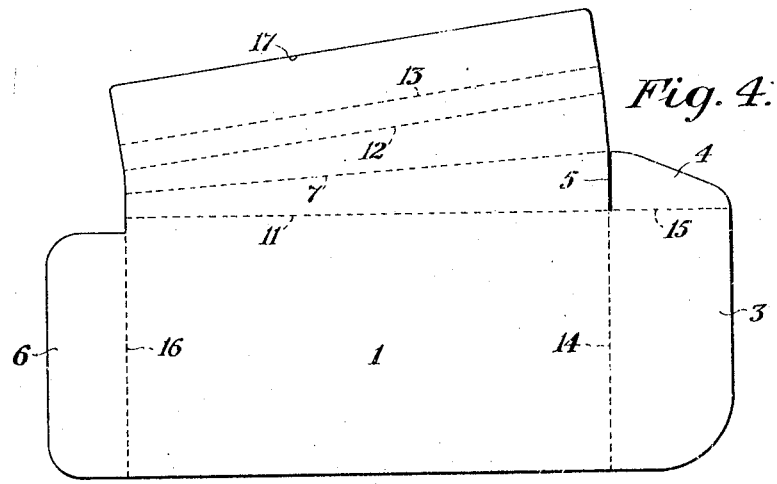
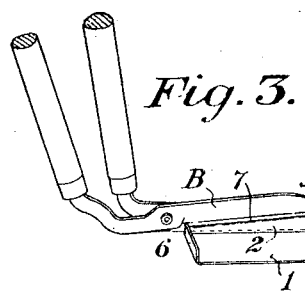
Inventor:
Henry Burton Scott,
By Dodge and Sons
Associate Attorneys

UNITED STATES PATENT OFFICE.

HENRY BURTON SCOTT, OF ROCK FERRY, ENGLAND.

GRASS-BORDER SHEARS.

1,338,873. Specification of Letters Patent. Patented May 4, 1920.

Application filed November 28, 1919. Serial No. 340,999.

*To all whom it may concern:*

Be it known that I, HENRY BURTON SCOTT, subject of the King of Great Britain, residing at Rock Ferry, in the county of Chester and Kingdom of England, have invented certain new and useful Improvements in or Relating to Grass-Border Shears, of which the following is a specification.

This invention has for its object to provide an improved detachable grass box or tray for edging or other garden shears for retaining the grass as it is cut, thus saving the labor and trouble of collection afterward.

A characteristic feature of the invention is this, that the grass box or tray can be applied in a moment to any edging or other garden shears and removed therefrom without the use of any nuts, bolts, set screws, spanners or the like.

The invention will be understood from the following description reference being had to the accompanying drawings in which:—

Figure 1 is a perspective view of the grass box;

Fig. 2 is a cross section thereof;

Fig. 3 is a view of a pair of edging shears with my grass box applied thereto the blades in this figure being wholly closed while in Fig. 2 they are only partly closed.

Fig. 4 is a view of the sheet metal blank from which my grass box or tray may be made.

Referring first to Fig. 1, 2 and 3, 1 is the floor of the grass box or tray, having an upstanding flange 2 at the edge adapted to rest against one face of the lower blade A of the shears, 3 is the front end of this floor which has an upturned marginal flange 4, there being a slit 5 between 2 and 4 to enable the front end 3 to be inclined a little. 6 is the rear end of the floor which is flanged upward perpendicular to the floor. The upper edge 7 of the upstanding flange 2 slopes from front to rear so as to lie parallel or approximately so with the cutting edge of the upper blade B when the blades are closed. At the side of the flange 2 opposite to that of the tray is a channel 9 to receive the lower blade A, the flange 10 at the back of this channel and the flange 2 being adapted to grip the blade between them. The flange 2 grips the blade A at one face, while the flange 10 grips the blade at the other face.

The point of the lower blade A being introduced into the trough 9 the tray is slid along the blade and is firmly gripped between the flanges 2 and 10 that is to say the flange 2 grips the blade at one face, while the flange 10 which is bent toward the flange 2 a little, and which is slightly springy, grips the blade at the opposite face, and the box or tray is held in position by the tightness with which the flanges grip the blade. When using the shears the cuttings drop upon the floor 1 and retain the grass as it is cut, thus saving the labor and trouble of collection afterward. As the tray gets filled the shears are lifted from time to time and grass cuttings emptied into some suitable receptacle.

The device can be made from a single sheet metal blank such as that shown in Fig. 4 though I do not confine myself to this particular shape of blank. One part 1 of this blank at one side of the dotted line 11 forms the floor of the tray, and the other part at the other side of the line 11 is so bent as to form the gripping channel 9 to engage the lower blade of the shears. The part 1 of the blank has projecting end portions 3 and 6, the projecting front end portion 3 being a little wider than the projecting rear end portion 6 so as to leave a margin 4 which has a transverse slit 5 in it. The dotted lines 11, 7, 12, 13, 14, 15 and 16 indicate the lines upon which the blank is to be bent, lines 11 and 15 being longitudinal, lines 7, 12 and 13 diagonal with respect to the line 11, and lines 14 and 16 transverse. The side edge 17 is clipped off obliquely as shown. The blank is first bent upward on the line 11 so as to stand at right angles to the floor 1, it is then bent downward on the line 7 so as to form the flange 2 of double thickness, and then bent at right angles thereto on the line 12 so as to form the bottom of the channel 9, and finally it is bent upward on the line 13 so as to form the flange 10. If the blank be bent on the lines 11, 7, 12 and 13 as indicated the edge 17 of the blank will lie parallel with the floor 1 and the bottom of the channel 9 will be coincident with the plane of the floor, while the top edge of the flange 2 will be inclined. The front end of the blank is bent into an inclined plane on the transverse line 14 and its margin is bent upward on the line 15, while the rear end of the blank is bent upward on the line 16, to prevent the grass falling off the tray at the rear.

I have not shown the floor 1, with any side flange opposite the flange 2 as in practice I find it is better without one. Edging shears are almost invariably held in a sloping position when being used, so that the floor 1 when the device is in use slopes downward toward the blade so that the grass is prevented from falling off the tray. A side flange can however be provided if desired though it would rather interfere with the grass cuttings being emptied from the tray.

I declare that what I claim is:—

1. As a new article of manufacture, a detachable grass box or tray for edging shears, comprising a laterally extending element having a trough-like channel to one side thereof adapted to frictionally grip the lower blade of the shears and the walls whereof lie in a plane clear of the upper blade.

2. A detachable grass box or tray for edging shears having a trough like channel at one side with two upstanding flanges, one of these flanges being adapted to abut against one face of the lower blade and having an upper edge which slopes from front to rear so as to lie parallel with the cutting edge of the upper blade when the blades are closed, and the other flange extending to a higher elevation and adapted to grip the opposite face of the lower blade.

3. A detachable grass box or tray for edging shears, made from a sheet metal blank so bent into channel form at one side of a longitudinal center line as to form a gripping element to clench onto the lower blade and yet be clear of the upper blade of the shears, the other portion at the other side of the said longitudinal line forming a box or tray element for catching the grass.

4. In a detachable grass box or tray for edging shears, the combination of a tray, an upstanding rear flange; a forwardly projecting upwardly sloping front portion, and a trough like element adapted for engagement with one of the shears blades, all of said parts being formed out of a single blank of sheet metal bent to form.

In witness whereof I have hereunto signed my name this 10th day of November, 1919, in the presence of two subscribing witnesses.

HENRY BURTON SCOTT.

Witnesses:
W. F. DAVIS,
I. McLACHLAN.